May 16, 1967   P. DOWNEY   3,319,787
UNLOADING AND SCREENING CHUTE FOR SHELLED CORN
Filed March 1, 1965
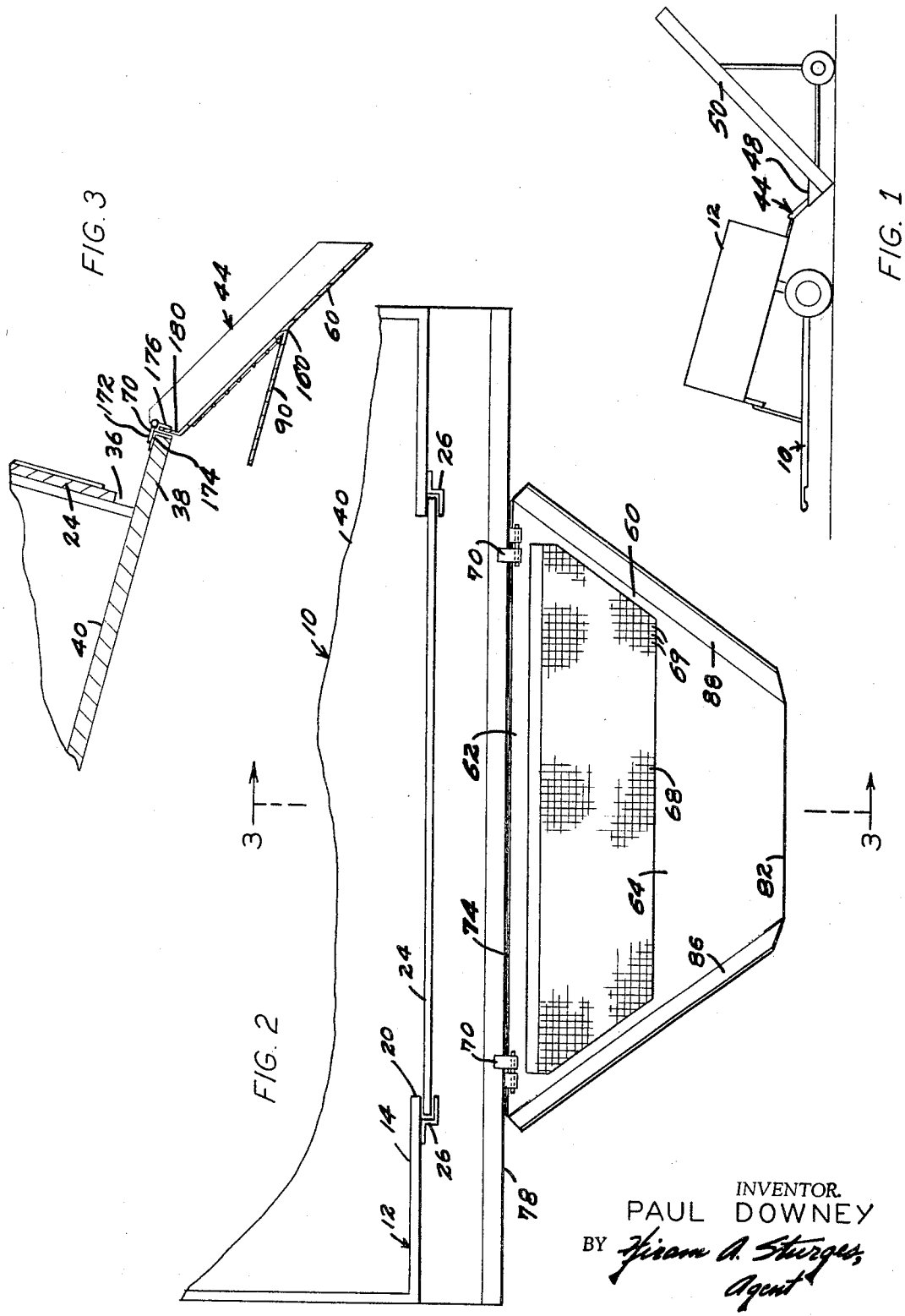
INVENTOR.
PAUL DOWNEY
BY Hiram A. Sturges,
Agent

3,319,787
UNLOADING AND SCREENING CHUTE FOR SHELLED CORN
Paul Downey, Rte. 1E, Merna, Nebr. 68856
Filed Mar. 1, 1965, Ser. No. 435,880
1 Claim. (Cl. 209—421)

This invention relates to shell corn processing apparatus, and more particularly it is an object to provide a separator for separating cracked and ground-up corn and other small parts of foreign material from the larger corn kernels.

More particularly it is an object to provide apparatus for accomplishing this purpose during the normal and continuous movement of corn from a dump box of a dump wagon or dump truck to a conveyor during the conveying of the corn upwardly into a storage bin.

Heretofore, the corn which has flowed from a conveyor into a storage bin has contained all of these smaller particles, and the smaller particles tend to fall directly downward filling the center of the bin while the kernels tend to roll over each other and flow to the sides of the bin.

These smaller particles of cracked and ground-up corn, dirt, and other foreign matter, which tend to build up in the center of the bin, form a column of closely packed particles which are too closely packed as to block and prevent adequate air passage therethrough, to the end that the small particles do not dry adequately and form rotted corn.

Worms are a further problem. Worms tend to accumulate in the moist particles in the center of a bin.

A particular object of the invention, therefore, is to provide corn which can be safely stored and which will bring higher prices when marketed because of its freedom from the twin blights: worms and rot.

Whenever air cannot adequtaely flow through a portion of stored corn "hot spots" will occur, as they are commonly called. Drying air forced into a bin will tend to flow where the resistance is least, and so it tends to stay away from the closely packed central column of small particles of cracked and ground-up corn.

Such columns are so tightly packed they form a barrier to air flow. The air just tends to flow around it through the path of least resistance which is through the larger corn kernels at the side.

When a spreading device is used at the top of a corn bin during filling with corn, the bunches of small particles tend to be spaced apart throughout the bin. However, since they are in bunches when they are in the dump wagon box, they tend also to be in bunches when in the bin, causing "hot spots."

A further object of the invention is to provide a deflector baffle disposed below the separator, the baffle preventing the screened out fine particles from falling back, or being blown by the wind back into a hopper of a conveyor, so that the fine particles are not only removed from the whole kernels, but kept away from the whole kernels.

In only one truckload of corn, even as much as two or three bushels full of cracked and ground-up corn and dirt and small particles are often present.

Prior art ear corn shellers have commonly had screens on the bottoms of their grain pans in order to screen out dirt and fine cracked corn. However, the screens on corn shellers have holes that are very tiny, whereas the screens of the separator of my invention would have far larger square openings in it of approximately one-fourth inch in both width and length.

Prior art combines do have coarse separating screens, but these coarse screens are for the purpose of separating the cobs from the corn and they are vastly more coarse or open-meshed than the screen of my separator. Combines are also commonly provided with attachments for using coarse screens of a mesh much more open than the one-fourth square inch screen of my separator for the different purpose of mixing feed containing various percentages of chopped cob.

A particular object is to provide a separator attachable at the end gate opening of a dump box of a dump wagon or dump truck so that as the corn flows therefrom to the hopper of a conveyor, the small cracked and ground corn particles are continuously and simultaneously separated so that no extra separating operations are necessary, and whereby the end gate of the dump body can be used to regulate the rate of flow so that the rate of flow is synchronized with the rate of conveying, the separator of this invention being of a preferably approximately one-fourth square inch square size to adequately perform its job of separation without impeding the rate of flow determined by "full capacity" for the conveyor.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 1 is a side elevation of a dumping vehicle shown with the unloading and screening chute of this invention attached thereto in a position for dumping corn into an elevator.

FIGURE 2 is a top plan view of the rearward portion of the dumping vehicle showing the unloading and screening chute attached thereto.

FIGURE 3 is a sectional view taken along the line 3—3 of FIGURE 2.

Referring to the drawings for a more particular description and in particular to FIGURE 1, we there see a dumping vehicle generally indicated at 10 having a wagon box 12 which can be filled with corn.

The wagon box 12 has a rear end wall 14 having a discharge opening 20 therethrough, which latter is normally maintained closed by an end gate 24 supported on the rear wall 14 by brackets 26. At times when this invention is being used, the end gate 24 is disposed in a somewhat raised position, as best seen in FIGURE 3, for providing therebeneath an outlet 36 through which corn can flow across a rearwardly projecting portion 38 of the floor 40 of the dumping vehicle or dump wagon 10.

At the rearward end of the rearwardly projecting forward portion or section 38 is disposed the unloading and screening chute 44 of this invention, which latter, as best seen in FIGURE 1, is disposed in a position for directing shelled corn into the hopper 48 of a conveyor 50 for its elevation to storage means, not shown.

Referring to FIGURES 2 and 3, the unloading and screening chute 44 will be seen to have a chute bottom 60 having a forward end 62 and a rearward end 64.

The chute bottom 60 has a screen section 68 which can also be called a screening section 68 having openings 69 therethrough of sizes for preventing the passage therethrough of corn kernels while permitting the passage therethrough of particles of cracked and ground-up corn and dirt substantially smaller than corn kernels.

Means such as hinge assemblies 70 are provided for attaching the chute to the rearwardly projecting floor section 38 of the dumping vehicle 10 for holding a straight forward edge 74 of the unloading and screening chute bottom 60 in parallelism with and closely adjacent the straight rearward edge 78 of the rearwardly projecting portion 38, whereby the chute bottom 60 is in a position rearwardly of and below the rearward end dump opening 20 of the dump box 12 in a position for gravity fall of small particles through the screening section 68 and also for gravity fall of larger corn kernels across the top of the screening section 68 to reach the rearward portion 64 of the bottom 60 and to flow across the latter out the rearward side 82 of the chute.

The chute 44 has upwardly projecting side walls 86 and 88, which latter preferably incline inwardly toward each other as the rearward edge 82 of the chute is approached, whereby they tend to funnel the corn rearwardly and inwardly for delivery to the hopper 48.

The chute 44 has a baffle 90 projecting from its under side and attached to the bottom 60 at a point 160, which latter is actually a line extending across the chute 44 on the rearward side of the screening section 68. The baffle 90, therefore, extends transversely entirely across the rearward side of the screening section 68 in a position to block small particles which have passed downwardly through the screening section 68 from blowing freely towards the rearward end of the chute 44 where they might otherwise become mixed with the larger corn kernels.

Storage of the chute 44 can be accomplished by swinging its rearward end upwardly about the hinges 70, which latter permit the chute to pivot about a horizontal axis extending transversely of the wagon box 12.

It will be seen that each hinge 70 has a forward portion 172 which, as best seen in FIGURE 3, extends across the top of an angle iron 174, which latter can also be called an angle bracket, and which latter is attached to the rearwardly projecting section 38 of the wagon bottom 40. Each hinge 70 further has a rearward and downwardly depending portion 176 attached to an upwardly extending forward wall 180 of the chute 44, the forward wall 180 being integral with and connected to the bottom 60.

The upwardly projecting wall 180 forms an angle of approximately 120 degrees with respect to the top of the bottom 60 of the chute, which latter is disposed in substantially a single plane.

The purpose of this particular angular relationship of the forward wall 180 and the bottom 60 is so as to dispose the forward wall 180 in a position for its forward side to engage the rearward side of the rearwardly projection section 38 of the wagon box, and in particular, the angle iron 174, which forms a part of the rearwardly projection section 38, so as to cause the bottom 60 to extend at an acute angle with respect to the vertical downwardly and rearwardly of the wagon box 12 at times when the wagon box is in a tilted or dumping position shown in FIGURES 1 and 3.

As thus described, it is believed that an unloading and screening chute for shelled corn is provided in combination with a dumping vehicle in a manner for acomplishing the objectives above set forth.

From the foregoing description, it is thought to be obvious that an unloading and screening chute for shelled corn constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

In combination: a dumping vehicle having a dump box having a rearward dump end provided with a discharge opening and an unloading and screening chute for shelled corn comprising a chute bottom having a forward end and a rearward end, said bottom having a screening section having openings therethrough of sizes for preventing the passage therethrough of corn kernels while permitting the passage therethrough of particles of cracked and ground-up corn and dirt substantially smaller than corn kernels, means for attaching said chute to the dump box of said dumping vehicle in a position rearwardly of and below said rearward end dump opening thereof in a position for gravity fall of small particles through said screening section and gravity fall of the larger corn kernels across the top of said screening section, said chute bottom lying generally in a plane, said chute having a forward wall attached to and extending upwardly from its bottom, the forward side of said forward wall having an obtuse angular relationship with respect to the said plane of said bottom for disposing a forward side of said forward wall in position for engaging the rearward edge of said rearwardly projecting floor section of said dump box to hold the chute so its bottom declines downwardly and rearwardly as its rearward end is approached when said dump box is in dumping position, and means connected to said chute for preventing small particles from blowing freely towards the rearward end of said chute.

References Cited by the Examiner

UNITED STATES PATENTS

| | | | |
|---|---|---|---|
| 892,406 | 7/1908 | Converse | 209—421 |
| 1,424,451 | 8/1922 | Crandall | 209—421 |
| 2,573,714 | 11/1951 | Karl | 193—5 |
| 3,083,057 | 3/1963 | Kiser et al. | 193—5 |

HARRY B. THORNTON, *Primary Examiner.*

L. EATHERTON, *Assistant Examiner.*